United States Patent [19]
Bensdorp

[11] 3,922,130
[45] Nov. 25, 1975

[54] APPARATUS FOR PRODUCING BARKY CHOCOLATE

[75] Inventor: Josef Ernst Marie Bensdorp, Bussum, Netherlands

[73] Assignee: Bensdorp International B.V., Bussum, Netherlands

[22] Filed: Apr. 17, 1974

[21] Appl. No.: 461,706

Related U.S. Application Data
[63] Continuation-in-part of Ser. No. 243,947, April 14, 1972, Pat. No. 3,850,561.

[30] Foreign Application Priority Data
Apr. 16, 1971 Netherlands................ 7105135

[52] U.S. Cl. ............ 425/223; 425/308; 425/315
[51] Int. Cl.² ........................................ A23G 3/02
[58] Field of Search .......... 425/223, 308, 335, 315, 425/363

[56] References Cited
UNITED STATES PATENTS
2,107,735   2/1938   Honig ..................... 425/335 X
2,323,907   7/1943   Harriss et al ................ 425/335

Primary Examiner—Francis S. Husar
Assistant Examiner—David S. Safran
Attorney, Agent, or Firm—Cushman, Darby & Cushman

[57] ABSTRACT

An automatic apparatus for producing barkies by scraping chocolate paste film from a roll. A scraper engaging the roll scraps chocolate onto a collecting plate, and after sufficient accumulation on the plate, means are employed for moving the plate away from the roll to a position where the accumulated chocolate is cut into sections. The means employed then moves the collecting plate and the cut chocolate thereon to a conveyor belt and tilts the collecting plate so that the chocolate will be deposited on the conveyor. A scraper may also be utilized at this point to assist in moving the chocolate off the collecting plate onto the conveyor.

11 Claims, 3 Drawing Figures

APPARATUS FOR PRODUCING BARKY CHOCOLATE

CROSS-REFERENCE TO RELATED APPLICATION

This application is a continuation-in-part of U.S. application Ser. No. 243,947, filed Apr. 14, 1972, now U.S. Pat. No. 3,850,561.

BACKGROUND AND SUMMARY OF THE INVENTION

This invention relates to a method and apparatus for producing chocolate in the form of chocolate barkies. Barkies are elongated pieces of chocolate having a ribbed outer surface and longitudinally extending small channels which impart to the piece of chocolate - particularly in cross-section - the appearance of bark. According to the teachings of the present invention the production of barkies is accomplished completely automatically.

According to the teachings of the present invention, barkies are produced by applying the chocolate paste as a thin film on a rotary cylinder, transferring the film by means of a scraper extending according to a generating line of the cylinder to a plate-shaped collecting means until it has accumulated to a strip of desired transverse dimensions, moving the collecting means away from the cylinder cutting the accumulated strip into pieces of the desired length, and discharging the barkies obtained thereby onto a conveyor belt.

The apparatus according to the teachings of the present invention is characterized by a chocolate paste reservoir, means for applying paste from the reservoir as a film onto a horizontal roller, a scraper which can be pressed horizontally with its free edge against the roller surface, a collecting plate which can swing about a horizontal shaft and a knife edge bearing on the side of the free collecting plate edge which can be pressed against the scraper, means for cutting the pieces, and means for transferring the pieces from the plate to a conveyor even if the chocolate is hot. The chocolate film is transferred to the collecting plate edge by the scraper urged thereagainst to form upset, superposed small ribs, which extend longitudinally thereof.

According to the invention the chocolate reservoir may be constructed as an elongated container with a funnel-shaped cross-section, the bottom of which if formed by sectors of two oppositely rotating rollers - a thrust roller and a transfer roller, - with shafts parallel to the longitudinal direction of the feed funnel, while the roller on which the paste film is deposited is located on the side of the transfer roller directed away from the thrust roller. Due to this construction the roller is accessible to the scraper and the collecting plate, as well as to cooling means for keeping the roller at the correct temperature proper paste consistency for forming loops on the collecting plate edge.

For automatically cutting the chocolate strip accumulated on the free edge of the collecting plate into separate barkies, the free leading edge of the collecting plate according to the invention is provided with cuts spaced over the edge length and directed normal the leading edge for admitting the knives of the knife edge bearing.

Means are provided for moving the collecting plate vertically upward to bring them within the cutting stroke of the knives. The vertically upwardly directed movement of the collecting plate ensures that when the edge of the collecting plate is moved away from the roll no paste film is removed from the roll. After the pieces have been cut, the same general means moves the collecting plate downwardly and tilts it forwardly so that the pieces will be deposited onto a conveyor belt. A scraper may be provided at the conveyor belt for scraping the pieces off the plate when they are still hot and tacky. Also, the scraper can be moved with a swinging motion to assist in moving the pieces off the plate.

During the cutting and removing operations, the roll must be stopped to keep chocolate from accumulating thereon. The same general means is utilized to stop the roll movement that is utilized to move the collecting plate along its path of movement, cut the accumulated chocolate into pieces, and operate the scraper for scraping the barkies from the collecting plate onto the conveyor belt. The invention will be disclosed in more detail with reference to the drawings showing an embodiment of the apparatus according to the teachings of the present invention.

DETAILED DESCRIPTION OF THE INVENTION

Figure 1:
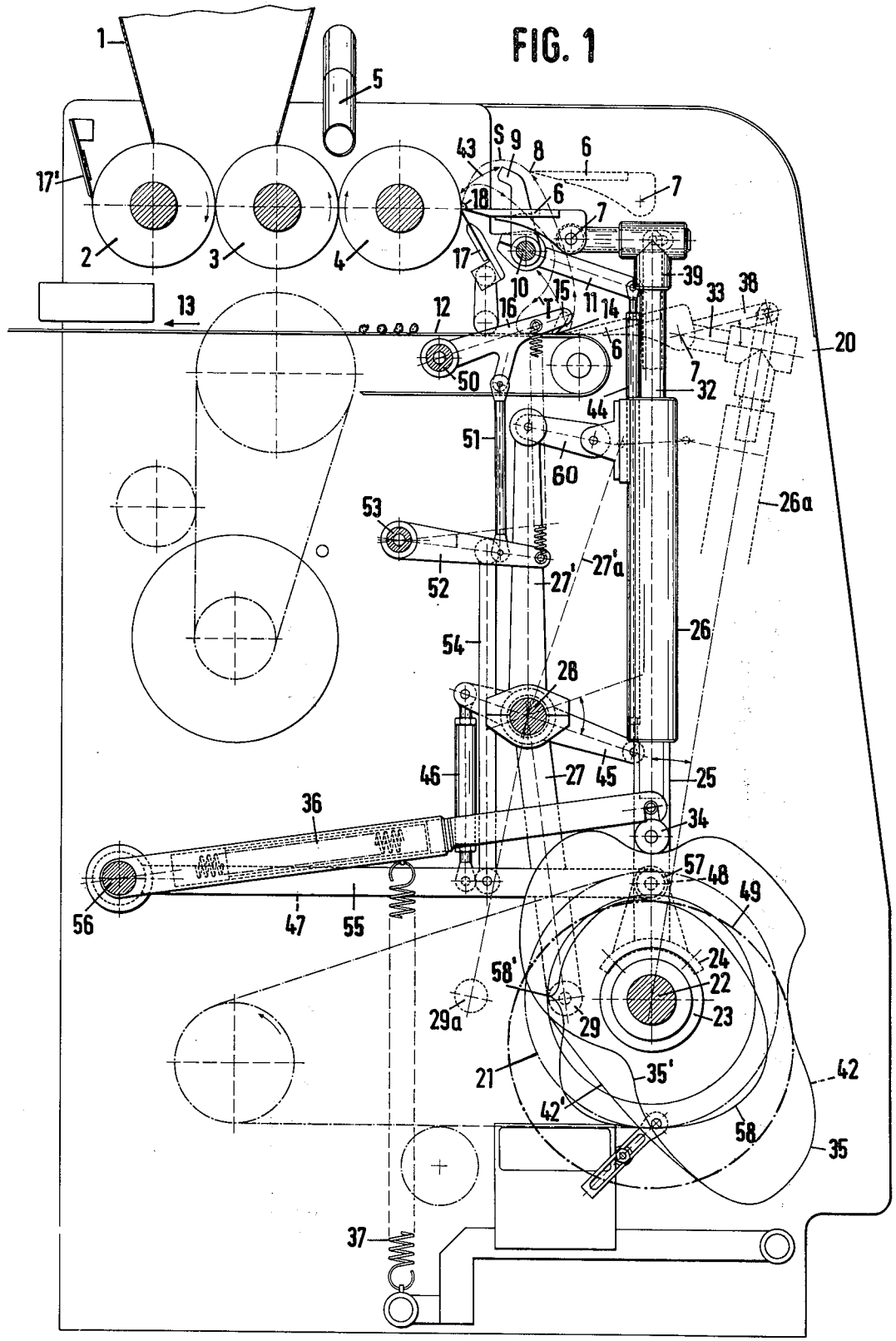
FIG. 1 is a side elevational view, partly in cross-section of the apparatus according to the teachings of the present invention taken substantially along lines I—I in FIG. 2.

As shown in the drawings the apparatus for producing barky chocolates comprises a funnel 1 for chocolate paste. At the bottom of the elongated funnel there are two rollers, a pressure roller 2 and a transfer roller 3. The paste is drawn in the nip between the rollers 2 and 3, sticks to the roller 3 and is transferred to a roll 4. Between the rollers 3 and 4 there is provided a means 5 which can blow cooling air on the rollers. On the side of the roll 4 which is directed away from the roller 3 there is a collecting plate 6 with a swivel shaft 7 and a leading edge 8. The collecting plate 6 extends over substantially the entire length of the roll 4, which again has substantially the same length as the funnel 1.

Figure 3:
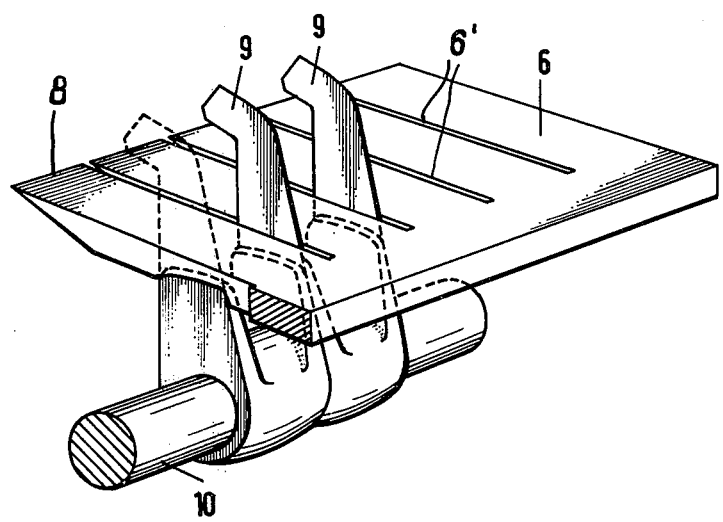
FIG. 3 is a detailed view in perspective of the collecting plate with the knives extending therethrough according to the present invention.

As is clear from FIG. 3, vertical cuts 6' are made in the bevelled, free leading edge of the collecting plate 6 transverse to the edge 8, through which vertical cuts knives 9 extend upwardly. The knives are connected to form a bearing which is ratatable about a shaft 10. The free upper end of the knives is curved towards the roll 4. At a level lower than the assembly of the connecting plate 6 and the knives 9 there is located a discharge conveyor belt 12 whose upper part is movable in the direction of the arrow 13. At the inlet end of the belt 12 a scraper 14 is mounted to swivel about a shaft 15 on a lever 16. The scraper 14 extends over a distance substantially equal to the length of the collecting plate 6. On both sides of the assembly of the rollers 2, 3 and the roll 4 there are disposed scrapers 17 and 17', the scraper 17 bearing against the roll 4 according to a generating line adjacent the axis of the roll. The drive of the various means will be discussed later in this specification.

The apparatus operates as follows: The chocolate paste sheet transferred from roller 3 to roll 4 is moved, the roll 4 rotating in accordance with the arrow, to the scraper 17 urged against the roll 4, said scraper scraping the sheet from the roll and depositing it on the leading edge 8 of the collecting plate 6, where it accumulates to form small, juxtaposed and superposed loops extending over the length of the leading edge 8 into a strip or ribbon of barky chocolate 18. When the strip 18 has reached the desired transverse dimensions the movement of the roll 4 is interrupted. The collecting plate 6 subsequently moves along the path T shown in FIG. 1 first almost vertically upwardly, so that the chocolate strip 18 formed is lifted from the paste sheet sticking to the roll 4. At the same time the chocolate strip 18 has arrived within the reach of the knives 9, which make the striking movement shown in FIG. 1, by 43 in the direction of the roll 4 and then return along the same path. The knives 9 move through the slots 6' (see FIG. 3) in the collecting plate 6 and thereby cut the strip of barky chocolate into a plurality of separate so-called barkies.

The collecting plate 6 then proceeds its way along the path T and with its bevelled leading edge 8 to the inlet end of the discharge conveyor 12, till the bevelled part at the bottom of the edge 8 comes to rest on the upper part of the belt 12. The scraper 14 has moved upwardly beforehand and in this stage it is placed behind the chocolate strip on the collecting plate 6. The collecting plate 6 is now withdrawn (the motion changes from path T to path S) so that the barkies are transferred by the scraper 14 from the edge 8 of the plate 6 to the conveyor 12.

Approximately simultaneously with the withdrawal of the collecting plate 6, the arm 16 - from which the scraper 14 is suspended for tilting movement - moves abruptly upwardly, so that the scraper 14 makes an abrupt centrifugal swivel movement around the swivel shaft 15 in counter-clockwise fashion as shown in FIG. 1. Barkies that are still fairly hot and possibly stuck to the scraper are thereby lifted and fall onto the conveyor 12, which discharges the barkies along the path indicated by arrow 13. The collecting plate 6 is returned to the scraper 17 adjacent the roll 4 and the cycle can start again by actuating the roll 4.

The control of the above movements of the three most important elements of the apparatus, viz. the collecting plate 6, the knives 9 and the scraper 17, will now be described. All the drive means are mounted in frame 20. All the movements of the above three elements are effected by a cam-shaft 22 driven via a pulley 21.

COLLECTING PLATE 6:

The movements of the collecting plate 6, particularly the leading edge 8 thereof, are indicated by the chain line T, S, wherein starting from the position shown in FIG. 1 first path T is followed downwardly and then path S upwardly and back to the starting position.

Figure 2:
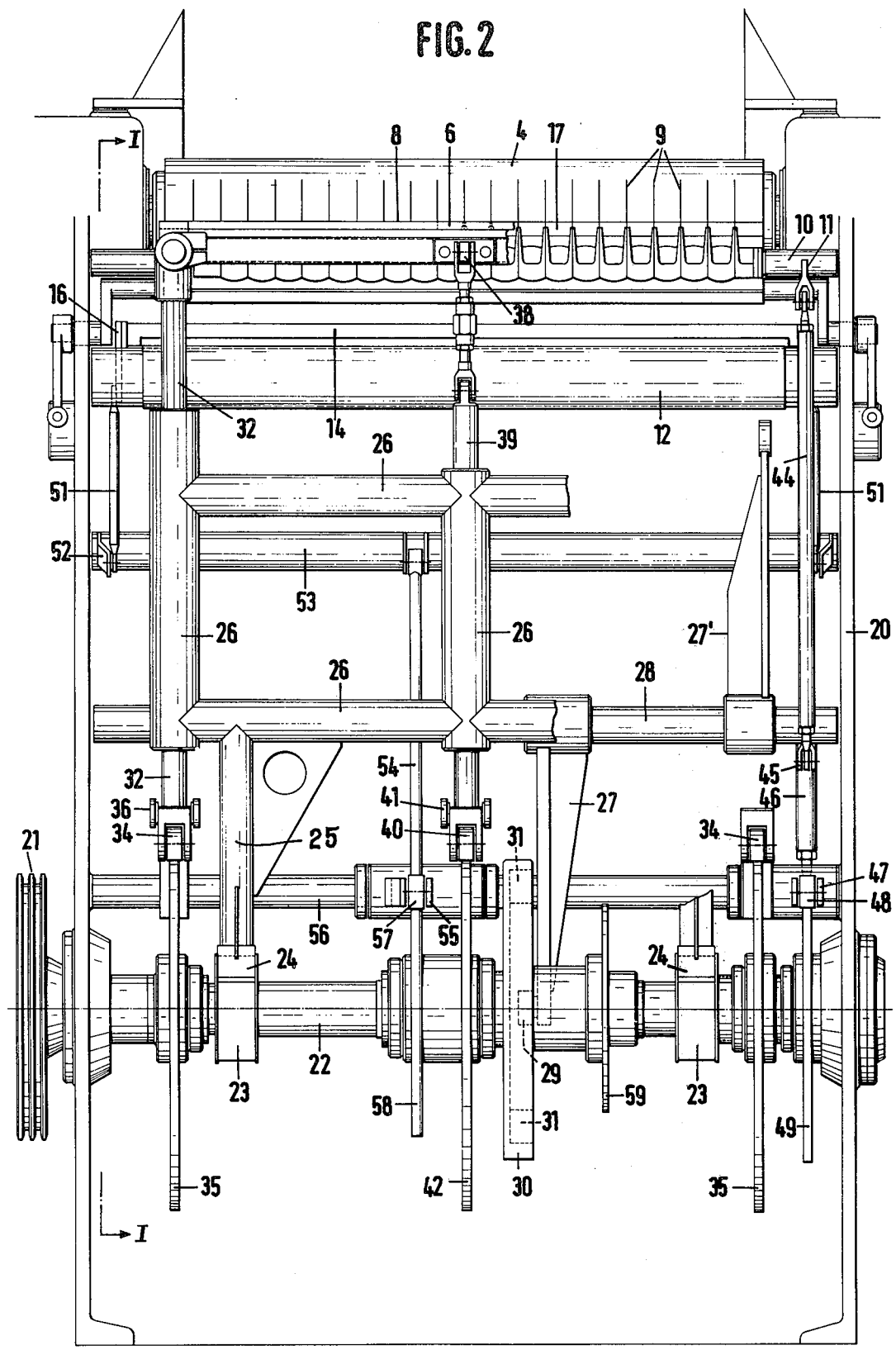
FIG. 2 is a rear view of the apparatus with some portions cut away for clarity.

A tilting frame 26 is mounted on the camshaft 22 by means of bearings 23 with supports 24 fixed thereon, as well as columns 25 (only one is shown in FIG. 2). The tilting frame 26 is adapted to swivel between the position shown in FIG. 1 in solid line and the position 26a shown in dotted line. This tilting movement is controlled by a two-arm lever system 27, 27', whose central portion is journalled on a shaft 28 journalled in the frame 20. At the free end of the lever part 27 there is a roller 29 confined in a cam path 31 provided in a disk 30 driven by the cam-shaft 22 (see FIG. 2). The shape of the cam path is such that when the disk 30 rotates, the roller 29 makes a reciprocating movement between the position shown in FIG. 1 by 29 to the position shown by 29a. In this latter position 29a of the roller 29, the lever part 27' is in the position shown by 27'a. The end of the lever part 27' remote from part 27 is connected with the tilting frame 26 via a connecting rod 60, so that with a fixed angular position between the lever parts 27 and 27', when roller 29 moves to the position 29a, the tilting frame is moved from the position 26 to the position 26a and vice versa.

In addition to the tilting movement necessary to move the collecting plate 6 along the back of the knife edge bearing 9, 10 the collecting plate 6 must also be vertically movable and tiltable about the shaft 7.

For the vertical movement of collecting plate 6 two sliding rods 32 are received in two vertical tubular parts of the frame 26 (FIG. 2 shows only the lefthand side tubular part of the frame 26). A rod 33 extends perpendicularly from the upper end of each of the sliding rods 32. The collecting plate 6 is tiltable between the free ends of the rods 33 about the shaft 7.

The lower end of each of the rods 32 is urged along with follower rollers 34 against cam-disks or curve-disks 35 by means of telescope assemblies 36 which are each drawn downwardly by a spring 37. One telescope assembly 36 cooperates with each rod 32. The cam-disk 35 therefore determines the height of the collecting plate 6 with respect to the tilting frame 26. Of course the spacial positions of the cam-path 31 in the disk 30 (which determines the tilting position of the frame 26) and the cam-disk 35 are coordinated to control the leading edge of the collecting plate 6 along the path T, S.

As observed above, the collecting plate 6 can also swivel with respect to the frame 26 for the purpose of putting the bevelled lower side of the edge 8 on the conveyor 12 in the position shown by 26a, so that the scraper can transfer the barkies from the collecting plate 6 to the conveyor 12.

The collecting plate 6 swivels about the shaft 7, and for this purpose the collecting plate is connected at the central portion thereof by means of the control rod 38 to the upper end of the sliding rod 39. The sliding rod 39 extends through a central hollow tube of the frame 26 and at the bottom thereof there is disposed the follower roller 40 (which is located behind the roller 34 in FIG. 1). Roller 40 is urged against a cam-disk or curve-disk 42 by a telescope assembly 41 of the same type as the telescope assemblies 36 by means of a spring [not shown]. As the swivelling of the collecting plate 6 must only take place during a part of the path T, S, the periphery of the cam-disk 42 differs from the periphery of cam-disks 35 only over the part of its periphery corresponding to this swivelling path. The cam disks 42 and 35 therefore have substantially the same periphery and spacial arrangement. Only in the part of the cam-periphery on the disks 35 corresponding to the lowest position of the frame 26 (in FIG. 1 indicated by 35') must the position of the frame 26 and the rod 39 relative to each other be changed in such a manner that the rod 39 is moved upwardly, i.e. away from the shaft 22. Therefore, the periphery of disk 42 corresponding to the periphery 35' of the disk 35, indicated at 42', is more remote from the shaft 22 than the corresponding periphery 35' of the disk 35.

KNIFE EDGE BEARING 9:

With the initial movement of the leading edge of the collecting plate 6, starting from the position shown in solid line in FIG. 1, the plate 6 reaches the approximately highest point of path T, within reach of the knives 9. These knives can be swivelled about the shaft 10, with the tops of the knives making the movement shown by 43 and thereby cutting the strip of chocolate lying on the edge of the collecting plate 6 into pieces.

For swivelling the knives the bearing in which they are fixed is tilted around the shaft 10 by means of a lever 11, which is connected to connecting rod 44, a tilting lever 45 and a connecting rod 46. The connecting rod 46 is connected to an arm 47 which together with a roller 48 is urged against cam-disk 49. The cam-disk 49 is eccentric with respect to the shaft 22, so that upon rotation of the disk 49 the roller 48 moves up and down with the arm 47 - and consequently the connecting rod 46, the lever 45, the connecting rod 44 and the lever 11. The contour of cam-disk 49 is formed so that the movement of the knives 9 is coordinated with the movement of collecting plate 6 along path T.

SCRAPER 14:

The scraper 14 is pivoted about a shaft 15 at the end of the arm 16. The arm 16 is pivoted for up and down movement about a shaft 50 by means of connecting rods 51 which can be moved up and down by an arm 55 via arms 52, a shaft 53, a centrally disposed connecting rod 54. The arm 55 is pivoted on shaft 56 (which also supports arm 47 and telescope assemblies 36). The arm 55 is provided at its free end with a roller 57, which cooperates with a cam-disk 58. The cam-disk 58 has a toothed portion 58'. When the follower roller 57 reaches part 58 the arm 55 is thrust upwardly and after the follower roller 57 has passed toothed portion 58 the arm 55 drops downwardly. This abrupt movement is transferred to the arm 16 - which together with the scraper 14 is suddenly thrust upwardly. The scraper 14 swivels during this movement, -as shown in FIG. 1 -about the shaft 15 and as a result of this swivelling throws pieces of chocolate, which have been scraped from the collecting plate 6 resting on the conveyor 12, onto the belt 12 even if the pieces of chocolate are still hot and somewhat tacky. FIG. 2 also shows a cam-disk 59 which actuates a motor switch [not shown] for controlling the movement of the rollers 2, 3 and the roll 4, particularly the stopping of the roll 4, when sufficient chocolate has collected on the edge 8 of the collecting plate 6 and when the collecting plate 6 moves along the path T, S.

The only manual step required in utilizing the apparatus according to the teachings of the present invention is checking the quantity of paste in the funnel 1. Thus, with the apparatus according to the invention, it is possible to produce uniform barkies automatically in an extremely simple, rapid and efficient manner.

What I claim:

1. Apparatus for producing chocolate barkies and the like comprising
   a roll rotatable about a horizontal axis of rotation, said roll having a circumferential surface thereof for supporting and moving therewith a film of chocolate paste or the like,
   a scraper having a free edge thereof engageable with said surface of said roll for scraping film from said roll,
   a generally horizontal collecting plate having a free edge thereof adjacent said free edge of said scraper, and having an upper surface, said collecting plate receiving on the upper surface thereof film scraped from said roll,
   a discharge conveyor disposed below said roll, and
   means for moving said collecting plate upwardly and away from said roll and then downwardly to a position in which said free edge of said collecting plate is adjacent said discharge conveyor.

2. Apparatus as recited in claim 1, wherein said means for moving said collecting plate moves said plate within the cutting stroke of cutting means for cutting said chocolate into pieces while on said plate after moving said plate away from said roll.

3. Apparatus as recited in claim 2 wherein said free edge of said collecting plate has a plurality of cuts spaced therealong and extending normal to the axis of said roll, and wherein said cutting means includes a knife extending through each cut.

4. Apparatus as recited in claim 1, further including scraping means above and adjacent to said discharge conveyor and intermittently movable into the path of movement of said collecting plate for scraping said chocolate from said plate.

5. Apparatus as recited in claim 4 wherein said scraping means includes a frame swingable about a movable horizontal shaft, said frame being movable over said edge of said collecting plate with chocolate accumulated thereon by means of a lever connected to said shaft so that said collecting plate can be withdrawn to leave said chocolate on said discharge conveyor.

6. Apparatus as recited in claim 5 wherein said scraping means further comprises means for moving said shaft abruptly upwardly after withdrawal of said collecting plate.

7. Apparatus as recited in claim 1, wherein said means for moving said collecting plate comprises pivotally mounted frame means operatively connected to said collecting plate, roller means operatively connected to said frame means, and first cam means for acting on said roller means and thereby pivoting said frame means and moving said collecting plate.

8. Apparatus as recited in claim 7 wherein said collecting plate is operatively connected to said frame means by a shaft allowing pivotal movement of said collecting plate relative to said frame means and wherein said means for moving said collecting plate further comprises lever means operatively connected to said collecting plate for pivoting said plate about said shaft with respect to said frame means, and lever means also operatively connected to second roller means for engagement with second cam means for moving said collecting plate about said shaft.

9. Apparatus as recited in claim 8 further comprising cutting means for cutting said chocolate on said collecting plate edge and means for moving said cutting means in a cutting stroke including third cam means.

10. Apparatus as recited in claim 9 further comprising means for stopping the rotation of said roll during movement of said collecting plate, said means including fourth cam means.

11. Apparatus as recited in claim 10 wherein said first, second, third and fourth cam means are all mounted on the same shaft and rotatable therewith.

* * * * *